Figure 1:
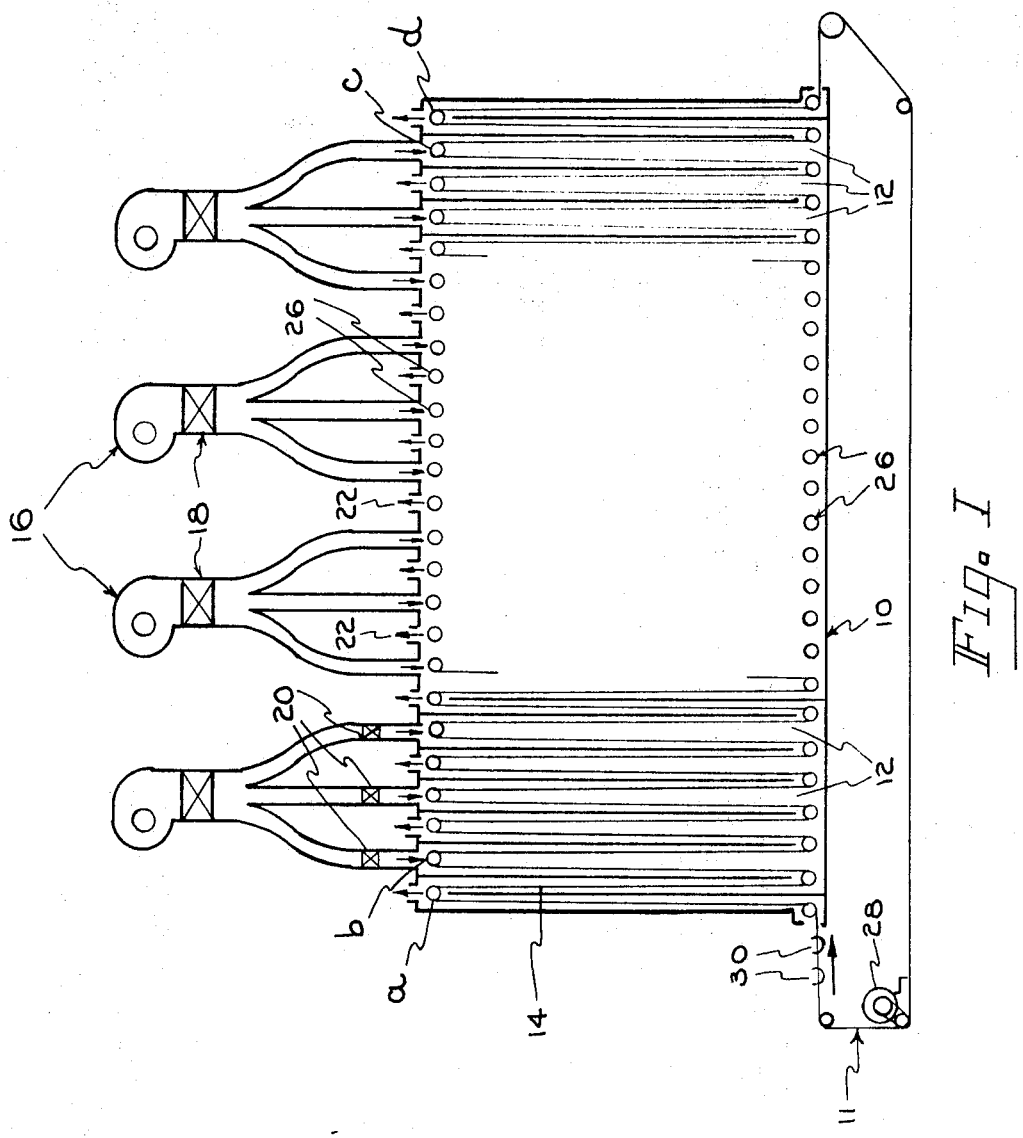

United States Patent

[11] 3,615,585

| | | |
|---|---|---|
| [72] | Inventor | Ogden A. Clemens<br>Chicago, Ill. |
| [21] | Appl. No. | 784,737 |
| [22] | Filed | Dec. 18, 1968 |
| [45] | Patented | Oct. 26, 1971 |
| [73] | Assignee | Swift & Company<br>Chicago, Ill. |

[54] METHOD FOR HEAT PROCESSING SAUSAGE-TYPE FOOD ITEMS
9 Claims, 2 Drawing Figs.

[52] U.S. Cl............................................................ 99/109
[51] Int. Cl...................................................... A22c 11/00
[50] Field of Search............................................. 99/109,
229, 363, 352, 208; 34/30, 48

[56] References Cited
UNITED STATES PATENTS
3,276,352  10/1966  Allen et al. .................. 99/352
3,408,205  10/1968  Olson et al................... 99/109

*Primary Examiner*—Hyman Lord
*Attorneys*—Edward T. McCabe, Charles E. Bouton and W. C. Davis ABSTRACT: A method for heat processing a plurality of items, such as sausages sequentially produced during a single batch or work shift, through a longer treatment involves transporting such items along a serpentine path through plural zones until the first item nearly reaches the end of the path and the last item has entered the path, whereupon the movements of the items are cyclically reversed and the conditions in the zones are sequentially equalized, whereafter the items are further transported and discharged from the end of the last zone.

INVENTOR.
OGDEN A. CLEMENS
BY
ATTORNEY

METHOD FOR HEAT PROCESSING SAUSAGE-TYPE FOOD ITEMS

This invention relates to an improved method of heat processing or temperature conditioning a plurality of sequentially produced items; and more specifically relates to an improved method for cooking and drying sausage-type food products.

There are many manufacturing processes requiring that the produced items be heat treated for a number of hours following initial production. For example, in the production of many dried sausage type of food items it is required to expose each sausage to air for a period of hours, days and even weeks under conditions that will reduce the moisture content of the meats to about 20 percent and less. The drying procedures constitute an expensive process from the standpoint of inventory tied up in a drying warehouse, capital investment in a large chamber and air-conditioning equipment for storing and drying a volume of product produced over several days, and the skilled and unskilled labor requirements for hanging, unhanging and managing the inventory during drying. Similar problems occur in manufacturing processes requiring the drying of finishes, hardening or curing of compositions, and in the chilling of items for storage or further processing.

Accordingly, it is a principal object of the present invention to provide an improved method for heat processing a batch of sequentially produced items in minimum time and with minimum equipment.

It is another object of the present invention to provide an improved method for heat processing a batch of sequentially produced items under uniform automatically controlled conditions that will not require the continuous presence of an operator.

It is still another object of the present invention to provide an improved method for drying sausage-type products in a minimum of time and with a minimum of equipment.

The present invention generally involves the introduction of items substantially sequentially either singly or in small groups into a treating chamber wherein there are a plurality of heat-treating zones contiguously arranged so that the items may be conveyed therethrough on a serpentine path. The items are transported along such a serpentine path arranged in equal length courses at a uniform speed whereby residence in each zone is in equal increments of time. The zones in turn are flushed continuously with a heat transfer fluid, preferably heated air, and the particular conditions of temperature and rate of fluid flow may be regulated independently through each zone. Before the first item reaches the last course in the last chamber, the introduction of additional items is terminated whereby upon the first item reaching an exit point in the last zone at least the first course in the first zone will be empty of items. Thereafter the items are transported in the reverse direction until the last-introduced item reaches the entry point, whereupon the direction of motion is again changed to the original direction. The direction of movement is thereafter cyclically reversed until the first item has received the full treatment desired, whereupon the items are transported in the original direction until all are discharged from the exit point. Preferably, the conditions within the zones are sequentially equalized upon the completion of movements in the reverse direction of each cycle.

Figure 2:
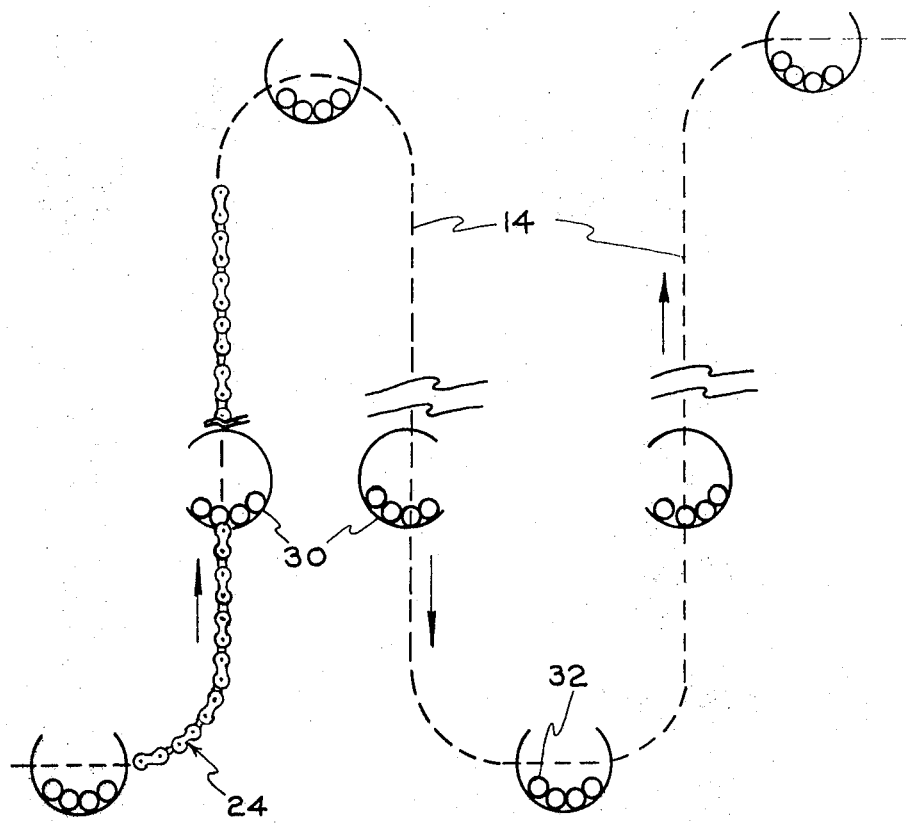

Further objects and advantages of the present invention will become apparent upon reading the following detailed description of a preferred embodiment in conjunction with the drawings wherein:

FIG. 1 is a schematic diagram of a preferred heat-processing chamber and path for transporting items therethrough; and FIG. 2 is a simplified drawing of a portion of the preferred apparatus for carrying items during processing.

The preferred embodiment of the present invention, which is performed in the apparatus shown in the drawings, was devised for cooking and drying sausages within a period of 24 hours. The equipment is sized to contain the total volume of product that can be produced in a sausage kitchen during one shift embracing approximately 5½ to 5¾ hours actual production time. The remainder of the usual 8-hour work shift is required for formula preparation, equipment and supply delivery and priming, and routine clean up and maintenance work.

As will be seen in FIG. 1, the preferred equipment includes an elongated sausage oven comprising a treating chamber generally 10 within which a serpentine conveyor generally 11 is run through a plurality of adjacent zones 12, separated by baffles, in a number of vertical courses 14. A plurality of sources generally 16 for heat-treating fluid are located overhead. These sources 16 are usually air fans which force large quantities of air through conduits and across heat exchangers generally 18, usually gas or electric fired heaters.

In the present embodiment the treating chamber generally 10 is divided into a first cooking oven section and a terminal drying oven section. The latter section is approximately 3 times the size of the cook oven. It has been found that the treatment conditions preferred for the drying oven section require relatively lower temperatures than preferred for the cook oven section. Accordingly a number of auxiliary heat exchangers 20, also heaters, have been provided in the fluid conduits between the primary heat exchanger 18 and the number of zones 12 in the cook oven section.

It will be seen that a series of three primary heaters 18 are similarly connected to the zones constituting the drying oven section of the chamber 10. However, in this area no additional heat exchangers are required. Preferably, the primary heat exchangers 18 and associated fans can supply an adequate volume of air at a flow rate of between 250 and 500 feet per minute at a temperature of about 130°–140° F. The auxiliary heaters 20 located in conjunction with the cook oven section can increase the temperature of approximately the same volume of air to about 180° F.

Where the purpose is to merely cook and dry sausage, no moisture is added to the air.

It will also be noted in FIG. 1 that air is introduced into alternate zones from the fans 16 and heat exchangers 18, 20. The heated air is forced downwardly through those zones and beneath the confining baffles and thence upwardly through the two adjacent zones and exits through fluid discharge ports 22. It may be preferred to connect the latter to a discharge manifold and either recirculate through the system or discharge to atmosphere outside the processing plant.

The serpentine conveyor 11 is comprised of a pair of endless chains generally 24 trained about a plurality of pulleys generally 26 located near the ceiling and floor of the chamber generally 10 so as to train the conveyor along two vertical courses 14 within each zone. The endless chains 24 are driven by an electric motor 28 located outside the chamber; and a plurality of cylindrical baskets a fixed between the chains so as to be nonpivotable. In FIG. 2 it will be noted that the cylindrical baskets are approximately 270° enclosed and are tilted first in one direction and then the other as the endless chains 24 pass around sprockets from an upward course to a downward course. It is preferred that a quantity of sausages be loaded in each cylindrical basket. As illustrated, groups of four sausages are inserted side by side and as many groups as possible are fitted end to end in each basket. Thus it will be apparent that a large daily volume of product can be accommodated by simply constructing the equipment with sufficiently long baskets 30. The sausages indicated at 32 will roll a few degrees in each basket as it is turned about each pulley 26. In this way, the exposed surface of each sausage is continuously changed so as to develop an even surface condition. The baskets 30 are preferably constructed of a perforate metal such as stainless steel to permit maximum flow of air across the sausages.

The present invention resides principally in the method of operation conducted in the foregoing apparatus. It is first to be noted that in the apparatus illustrated, product carried vertically on the first course 14 within the chamber generally 10 is exposed essentially to room conditions and therefore is considered to enter into a treating zone only upon passing an entry point "A" at the first overhead pulley 26. Similarly, the last downward course of the serpentine conveyor at the opposite discharge end of chamber generally 10 is also essentially at room conditions and therefore product is considered to exit from the treating zones at point "D" where passing about the last overhead pulley 26. The apparatus is first started and allowed to reach equilibrium temperature and flow conditions. Product is preferably produced on location and inserted into the cylindrical baskets 30 in small groups of 4 sausages each. The sausages may be produced in any convenient manner so long as they are self-sustaining at the point of loading into the baskets.

It is intended that the serpentine conveyor 11 be operated in the forward direction at a uniform rate of speed which will carry the first items of product to a point "C" located at one or more courses in advance of the exit point "D" in the time period wherein production of the kitchen is continued during one shift. It is preferred that this require approximately 5½ hours. However, the sausages are completely cooked to an internal temperature of 140° F. in a period of approximately 1½ hours (90 to 105 minutes). Accordingly, it has been found convenient to provide six zones of 12 courses in the cook oven section with a conveyor speed providing 7½ minutes per course (15 minutes per zone). The drying section of the oven is similarly provided with 18 zones comprising 36 courses requiring a total time of 5 hours for full traverse. However, to completely dry the product, it should be exposed to the air flow at 130°–140° F. for about 22 to 22½ hours.

Accordingly, upon the first produced sausages reaching the course preceding point "C" production of further sausages is terminated so that when the first sausages reach point "c," the last-produced sausages will arrive at the entry point "A." Thereafter, the conveyor 11 continues C," run forward until the first produced sausages traverse two additional courses and reach the exit point "D." At this time the last produced sausages will have advanced two courses within the cook oven section to point "B." At the latter time, the electric motor 28 is reversed to drive the serpentine conveyor 11 in the opposite direction until the last-produced sausages again reach entry point "A." At this time, the product within the last zone of the cook oven section will have been exposed to cooking conditions for a slightly greater period of time than the earlier product (specifically the time required to traverse the repeated courses which in the preferred embodiment is 15 minutes). At this time, the auxiliary heater 20 feeding the last zone of the cooking section is turned off and the air introduced to that zone immediately drops to 130°–140° F. At the same time the electric motor 28 is again reversed to run the serpentine conveyor in the original direction until the last produced product reaches the point "B" and at that time the conveyor is again reversed to run in the opposite direction to return the last product to point "A." At the latter point the next succeeding auxiliary heater 20 connected to the midzones of the cook oven section is also turned off and thence the conveyor is driven forward again until the last product again reaches point "B." The cycle is again repeated until the last auxiliary heater 20 is turned-off at the end of conveyor movement in the reverse direction.

Thereafter the cycles are completed until the first produced product (that is confined to be moved backwards and forwards between points "C" and "D") completes the full processing time required. When the latter condition is reached, the conveyor generally 11 is continuously operated in the forward direction until all product is discharged. It will be seen that where the processing conditions are selected to allow full processing in 24 hours the apparatus need never be closed down. It will take the normal production time for the previous day's product to be completely discharged from the apparatus. During this period, which will occur during the next work shift, the operators are producing new product and introducing it into baskets 30 at the cook oven section of the chamber 10. The auxiliary air heaters are again turned on sequentially as the new product reaches the respectively associated zones so as to cook the new product; and the primary air heaters are never turned off.

Obviously many modifications and variations of the invention as hereinbefore set forth may be made without departing from the spirit and scope thereof, and, therefore, only such limitations should be imposed as are indicated in the appended claims.

I claim:

1. An improved method for heat processing a plurality of sausage type food items, said method comprising: introducing said items sequentially to a first heat-treating zone; transporting said items along a serpentine path in a first direction from an entry point in said first zone through a plurality of heat-treating zones to an exit point from a final zone, said path being arranged in desired numbers of equal length courses in each of said zones; forcing air through each of said zones and across any of said items therein, said air being conditioned to desired temperatures in each of said zones; terminating the introduction of said items to said first zone at a time the first items reach a point along said path at least one course in advance of the exit point in said final heat-treating zone; continuing to transport said items in said first direction until said first items reach said exit point; reversely transporting all of the items along said path in the opposite of said first direction, upon said first item reaching said exit point, until the last item introduced returns to said entry point; thereafter cyclically transporting all of said items on said path in said first and reverse directions between said exit and entry points for a desired period of time, said period of time being sufficient to complete the treatment of the first-introduced item; and finally transporting all of said items in said first direction past said exit point until the last-introduced item is discharged therefrom.

2. The method of claim 1 wherein the air forced through said final zone is at a different temperature than the air forced through at least some of the other zones.

3. The method of claim 2 wherein the temperature of the air forced through said other zones is equalized with said final zone after reversely transporting said items.

4. The method of claim 3 wherein there are a plurality of said other zones in advance of said final zone and the temperature of the air forced through each next preceding zone of a different temperature is equalized successively upon the completion of reverse direction movements of each succeeding transporting cycle.

5. The method of claim 3 wherein said temperatures are elevated above normal room temperature.

6. The method of claim 4 wherein sausage items are transported for periods of time sufficient for said sausage items to become cooked and dried by heated air forced through a large number of zones, said zones being divided into a major number of continuous zones ending with said final zone wherein the air is at a uniform relatively lower temperature for drying said sausages, and a minor number of contiguous zones beginning with said first zone wherein the air is a uniform relatively high temperature for cooking said sausages to an internal temperature of 140° F.

7. The method of claim 6 wherein the air forced through said major number of zones is heated to about 130°–140° F. and the air forced through said minor number of zones is initially heated to about 180° F.

8. The method of claim 7 wherein the sausages are transported at a uniform and equal speed through all courses in each direction, and the number of courses and zones in said minor and major numbers of said zones are apportioned in accordance with a selected speed to expose all sausage items to said air at about 180° F. for about 90–105 minutes whereby to obtain an internal temperature of about 140° F., and to expose all sausage items to air at about 130°–140° F. for a period of about 22** hours to reduce the moisture content to about 20 percent.

9. The method of claim 6 wherein the sausages are rolled between each of said courses whereby to change the exposure of the surfaces of said sausages.

PO-1050
(5/69)

UNITED STATES PATENT OFFICE
CERTIFICATE OF CORRECTION

Patent No. 3,615,585          Dated October 26, 1971

Inventor(s) Ogden A. Clemens

It is certified that error appears in the above-identified patent and that said Letters Patent are hereby corrected as shown below:

Column 2, line 52 -- after baskets, cancel "a" and substitute therefor -- are --;

Column 3, line 32 -- after continues, cancel "C" and substitute therefor -- to --;

Column 4, line 69 -- after about, cancel "22**" and substitute therefor -- 22-1/2 -- .

Signed and sealed this 20th day of March 1973.

(SEAL)
Attest:

EDWARD M. FLETCHER, JR.          ROBERT GOTTSCHALK
Attesting Officer                Commissioner of Patents